United States Patent
Koch et al.

(10) Patent No.: US 12,136,851 B2
(45) Date of Patent: Nov. 5, 2024

(54) STATOR INCLUDING A STATOR BASE BODY WITH AXIAL GROOVES AND RADIALLY PROJECTING JOINING ELEMENTS DISPOSED IN SAID AXIAL GROOVES AND AN ELECTRIC MOTOR INCLUDING SAID STATOR

(71) Applicant: Brose Fahrzeugteile SE & Co. Kommanditgesellschaft, Wuerzburg, Wuerzburg (DE)

(72) Inventors: Kevin Koch, Fuerth (DE); Michael Duencher, Wuerzburg (DE); Jochen Dehn, Veitshoechheim (DE)

(73) Assignee: BROSE Fahrzeugteile SE & Co. Kommanditgesellschaft, Wuerzburg, Wuerzburg (DE)

( * ) Notice: Subject to any disclaimer, the term of this patent is extended or adjusted under 35 U.S.C. 154(b) by 298 days.

(21) Appl. No.: 17/548,771

(22) Filed: Dec. 13, 2021

(65) Prior Publication Data
US 2022/0103026 A1   Mar. 31, 2022

Related U.S. Application Data

(63) Continuation of application No. PCT/EP2020/065953, filed on Jun. 9, 2020.

(30) Foreign Application Priority Data

Jun. 11, 2019   (DE) ............... 10 2019 208 426.5

(51) Int. Cl.
  *H02K 1/18*   (2006.01)
  *H02K 1/14*   (2006.01)
  *H02K 5/15*   (2006.01)
  *H02K 5/24*   (2006.01)

(52) U.S. Cl.
  CPC ............ *H02K 1/185* (2013.01); *H02K 1/148* (2013.01); *H02K 5/24* (2013.01); *H02K 5/15* (2013.01)

(58) Field of Classification Search
  CPC .......... H02K 1/185; H02K 1/148; H02K 5/24; H02K 5/15; H02K 1/146
  See application file for complete search history.

(56) References Cited

U.S. PATENT DOCUMENTS

| 3,652,889 | A | * | 3/1972 | Reece | ............... | H02K 1/185 |
| | | | | | | 310/216.011 |
| 4,634,909 | A | * | 1/1987 | Brem | ............... | H02K 1/185 |
| | | | | | | 310/91 |
| 4,891,540 | A | * | 1/1990 | Cooper | ............... | H02K 1/185 |
| | | | | | | 310/91 |

(Continued)

FOREIGN PATENT DOCUMENTS

| DE | 102009010177 A1 | 10/2009 |
| EP | 3493369 A1 | 6/2019 |

(Continued)

*Primary Examiner* — Bernard Rojas
(74) *Attorney, Agent, or Firm* — Laurence A. Greenberg; Werner H. Stemer; Ralph E. Locher

(57) ABSTRACT

A stator for an electric motor has a stator base body, which has stator teeth arranged in a star shape and a stator yoke, and on whose outer circumference a number of axial slots are provided, into which joining elements projecting radially from the circumference of the stator base body are radially inserted in a form-fitting manner.

10 Claims, 5 Drawing Sheets

(56) References Cited

U.S. PATENT DOCUMENTS

| | | | |
|---|---|---|---|
| 6,720,699 B1* | 4/2004 | Shah | H02K 1/16 310/182 |
| 7,847,444 B2 | 12/2010 | Kingman et al. | |
| 2003/0201689 A1* | 10/2003 | Shah | H02K 11/014 310/216.076 |
| 2005/0236924 A1* | 10/2005 | Sargeant | H02K 1/185 310/418 |
| 2008/0042514 A1 | 2/2008 | Cook et al. | |
| 2021/0006102 A1 | 1/2021 | Buettner et al. | |

FOREIGN PATENT DOCUMENTS

| | | |
|---|---|---|
| JP | S5588544 A | 7/1980 |
| JP | H04364339 A | 12/1992 |

\* cited by examiner

STATOR INCLUDING A STATOR BASE BODY WITH AXIAL GROOVES AND RADIALLY PROJECTING JOINING ELEMENTS DISPOSED IN SAID AXIAL GROOVES AND AN ELECTRIC MOTOR INCLUDING SAID STATOR

CROSS-REFERENCE TO RELATED APPLICATION

This application is a continuation, under 35 U.S.C. § 120, of copending International Patent Application PCT/EP2020/065953, filed Jun. 9, 2020, which designated the United States; this application also claims the priority, under 35 U.S.C. § 119, of German Patent Application DE 10 2019 208 426.5, filed Jun. 11, 2019; the prior applications are herewith incorporated by reference in their entirety.

FIELD AND BACKGROUND OF THE INVENTION

The invention relates to a stator for an electric motor, in particular for an electric steering motor of a motor vehicle, with a stator base body having stator teeth arranged in a star shape and a stator yoke. It further relates to an electric motor with such a stator, which is arranged in a motor housing.

An electric motor as an energy converter of electrical energy into mechanical energy has a stator, which forms the stationary motor part, and a rotor, which forms the moving motor part. In the case of an internal rotor motor, the stator is usually provided with a stator yoke, on which stator teeth projecting radially to-wards the center, i.e. inwards in a star shape, are arranged, the free ends of which facing the rotor form the so-called pole shoe. Windings or coils are mounted on the stator teeth, which are connected to the stator winding and generate a magnetic field during electromotive operation. To guide and amplify the magnetic field generated by the energized windings, the stator material is usually metallic, for example of soft magnetic iron.

Published, non-prosecuted German patent application DE 10 2013 009 407 A1 discloses a stator for an electric motor, which is formed from a star-shaped stator laminated core and a cylindrical stator yoke formed from stacked annular laminations, into which the star-shaped stator laminated core is inserted. A number of the annular laminations respectively has at least one bending lug on the outer circumference. By means of radially extending bending lugs, a fixing with simultaneous centering and positioning of the stator in a housing is made possible. In the joined state, the stator is only in contact with the inner wall of the housing at contact points provided at exposed points, which are formed by the bending lugs. If the individual annular laminations are provided with notches, into which the bending lugs can be bent before or during the process of joining the stator to the housing, a space-saving design of an electric motor with a stator inserted in its housing is also made possible.

From Japanese patent application JP 2014-018001 A1, it is known to fix the stator of an electric motor in a predetermined position inside the motor housing by means of spring lugs, wherein the fixing lugs are held to the housing with one end. The other end of the fixing lugs, which projects obliquely into the interior of the housing, is located in an axial joint groove on the outer circumference of the stator.

Published, non-prosecuted German patent application DE 10 2007 058 072 A1, corresponding to U.S. Pat. No. 8,203,248, discloses an electric motor with a stator, which is composed of a stack of laminations and is arranged in a housing, wherein the laminations are held together by a spring clip, which engages axially over the stack of laminations and supports the latter radially on the inner wall of the housing. The spring clip has a spring back projecting radially beyond the outer circumference of the stack of laminations and, on the opposite narrow sides, has clamping feet, which engage over the end face of the stack of laminations.

In particular in an electric steering motor of a motor vehicle, the stator can deform as a result of electromagnetic forces caused by operation, wherein such deformations can become very large, for example in the case of a 10-pole electric motor, so that a high level of structure-borne noise is transmitted to the motor housing accommodating the stator. To reduce the transmission of structure-borne noise, the stator should be decoupled from the housing.

SUMMARY OF THE INVENTION

The invention is based on the task of specifying a particularly suitable stator for an electric motor. In particular, the stator should be particularly suitable with respect to a decoupling for reducing or avoiding the transmission of a structure-borne noise to a motor housing. In this context, the stator should be easily insertable or respectively mountable into the housing and decoupled therefrom. Furthermore, an electric motor with such a stator in a housing (motor housing) is to be specified.

This task is solved according to the invention with respect to the stator with the features of the independent stator claim and with respect to the electric motor with the features of the independent electric motor claim. Advantageous embodiments and further developments are subject of the subclaims.

For this purpose, the stator for an electric motor has a stator base body with a stator yoke as a magnetic yoke and with a number of stator teeth, which extend radially inwards in the direction of a central stator or motor axis and end in the so-called pole shoe. The stator base body can be designed as a solid body, in the so-called single-tooth design or in the star-yoke design, in which the stator teeth are inserted into a cylindrical stator yoke, for example as a star collar.

A number of axial grooves are provided on the outer circumference of the stator base body, into which joining elements are radially inserted in a form-fitting manner, the joining elements projecting radially from the circumference of the stator base body.

The joining element preferably has a platelet-shaped or strip-shaped base body and at least one radially raised coupling element projecting from the axial groove in the radial direction. The joining element seated in the axial groove preferably forms a (mechanical) interface to a motor housing, in which the stator is inserted. The interface has a decoupling, damping, clamping, positioning and/or fixing effect (function) in particular.

The joining element, which preferably acts as a decoupling or damping element and is inserted into the respective axial groove of the stator base body on the yoke or respectively the back coupling side by insertion in the axial direction, suitably engages behind an undercut formed in the axial groove. For this purpose, the respective axial groove is expediently dovetail-shaped. The axial groove may also be T-shaped. It is essential that the axial groove provides a radial undercut, which is engaged behind by the joining element or respectively by its base body. Other shapes (cross-sectional shapes) of the axial groove are also conceivable, for example a part-circle shape or a T-shape with a local elevation or a local depression (bead) in the groove bottom of the horizontal T-leg of the axial groove.

A "form fit" or a "form-fitting connection" between at least two parts connected to each other here and in the following is understood to mean in particular that the cohesion of the parts connected to each other takes place at least in one direction, here the radial direction related to the central axis of the stator and the axis of rotation of the electric motor, by a direct interlocking of contours of the parts themselves. The "blocking" of a mutual movement in this direction, here the radial direction, thus takes place due to the shape. In the present case, the joining element is thus held radially in a form-fitting manner in the axial groove of the stator tooth.

The joining element can be an injection molded part or a stamped and bent part. The base body projects beyond the respective coupling elements transversely to the axial direction in the circumferential direction on both sides. With the azimuthally projecting sections on the longitudinal sides running in the axial direction, the base body engages behind the (azimuthal) groove legs of the axial groove extending in the circumferential direction of the stator, as a result of which the radial form fit between the spring element and the respective stator tooth is produced.

In a suitable further development of the joining element, a shaped piece is provided on a narrow side (end face) of the base body. The shaped piece suitably has an abutment edge, by means of which the joining element rests against an end face of the stator base body, in particular in the region of a respective stator tooth.

In an expedient advantageous embodiment of the joining element, at least one clamping claw is provided on one longitudinal side of the base body. The respective clamping claw is suitably bent out of the plane of the base body of the joining element. This achieves a reliable fixing (holding, fastening) of the joining element in the axial groove of the stator base body assigned to it.

The electric motor according to the invention has a rotor shaft and a shaft-fixed rotor as well as a stator and a housing, in which the stator is arranged with joining elements inserted axially into axial grooves on the outer circumference and held therein in a radially form-fitting manner, in particular in a manner decoupled from structure-borne noise, clamping and/or damping. By means of the shaped piece of the joining elements inserted into the axial grooves, the stator is supported on a bearing shield of the electric motor, so that decoupling or damping of the stator from or respectively with respect to the bearing shield is also provided.

Other features which are considered as characteristic for the invention are set forth in the appended claims.

Although the invention is illustrated and described herein as embodied in a stator for an electric motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Corresponding parts are marked with the same reference signs in all figures.

Figure 1:
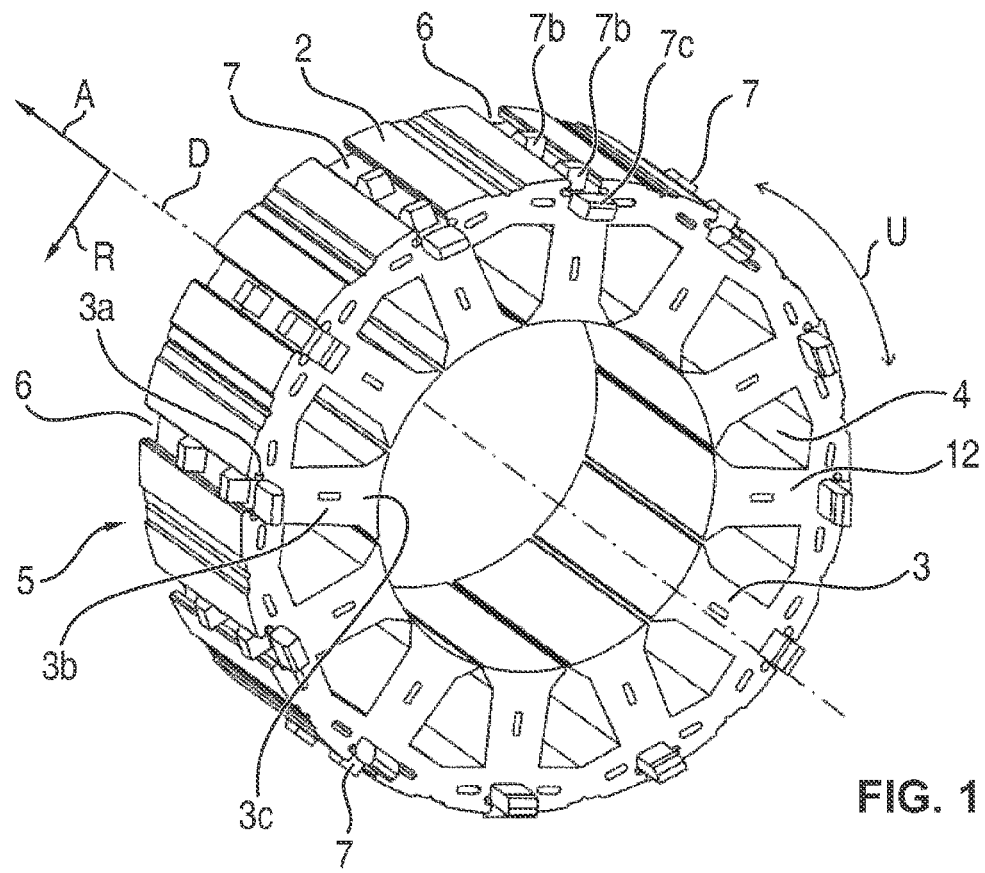
FIG. 1 is a perspective view of a stator of an electric motor, with a first variant of a stator base body and radially inwardly oriented stator teeth and with joining elements inserted in circumferential axial slots in a radially form-fitting manner.
Figure 2:
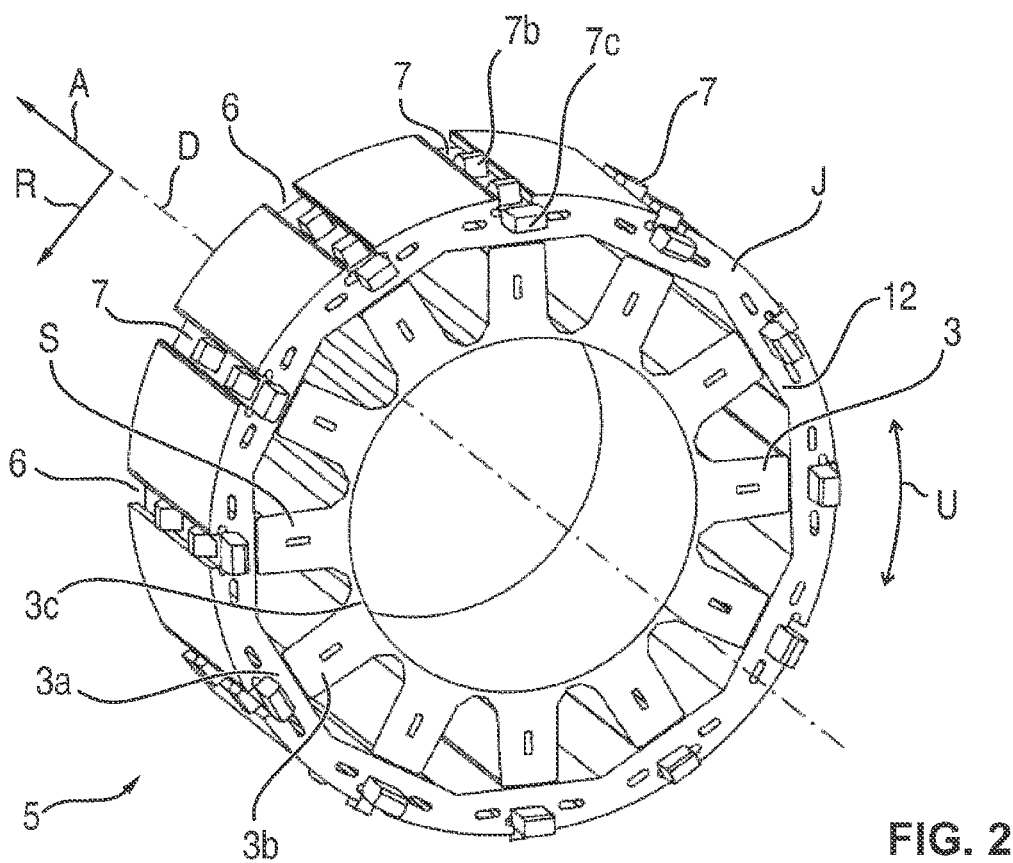
FIG. 2 is a perspective view of the stator of the electric motor, with a second variant of the stator base body and radially inwardly oriented stator teeth (star-yoke design) and with the joining elements inserted in circumferential axial grooves in a radially form-fitting manner.

Referring now to the figures of the drawings in detail and first, particularly to FIGS. 1 and 2 thereof, there is shown a stator 1, the stator base body 2 of which has a number of stator teeth 3, twelve in the embodiment example, which extend inwardly in the radial direction R (radially) towards a central axis of rotation D shown in the drawing. Free spaces 4 are formed between the stator teeth 3, in which the windings of coils are accommodated in a manner not shown in more detail, which are connected to each other in a star or delta connection to form the stator or rotating field winding.

Figure 5:
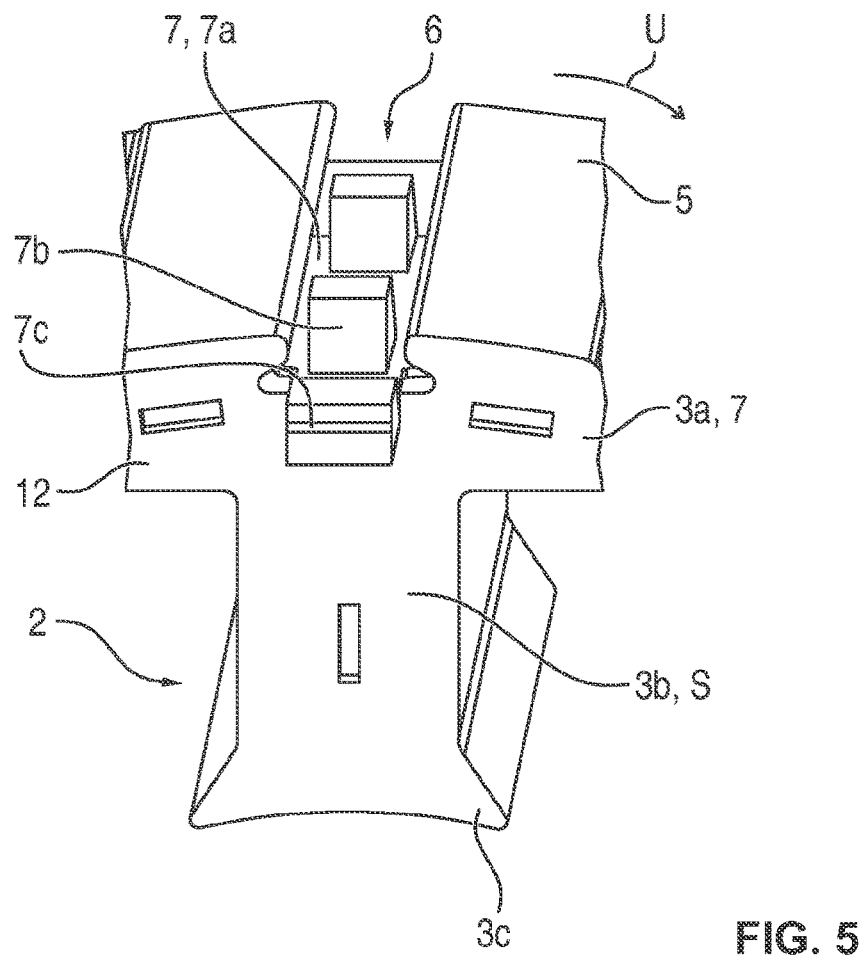
FIG. 5 is a perspective view of the section of the stator base body with a joining element inserted in its outer circumferential axial groove.
Figure 6:
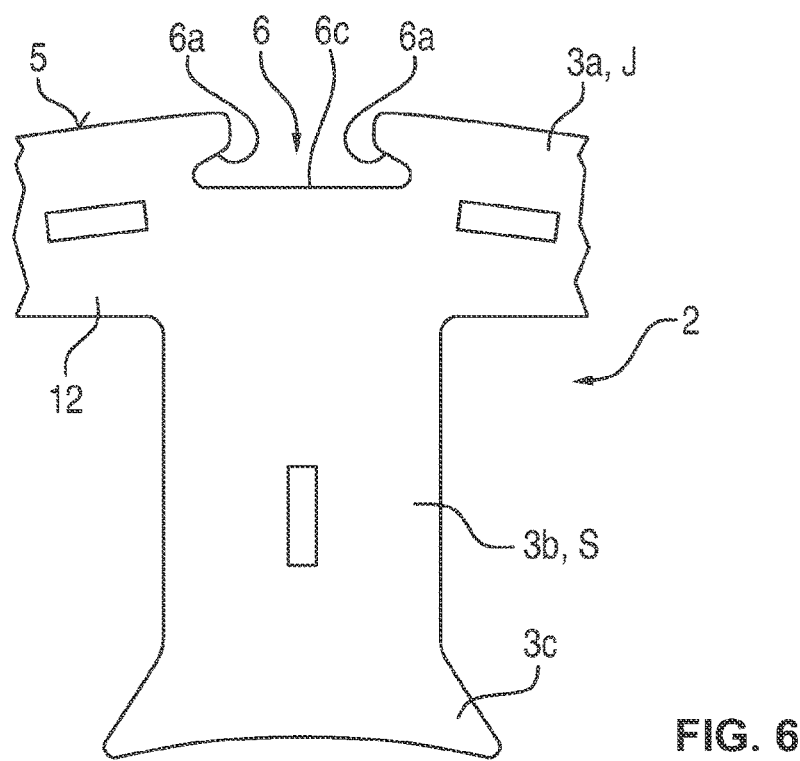
FIG. 6 is a front side view of the section from FIG. 5 with an axial groove that is dovetail-shaped in cross-section.

With reference also to FIGS. 5 and 6, the stator base body 2 has, in the region of each stator tooth 3, an azimuthal yoke or return section 3a extending in the circumferential direction U (FIG. 1) and a radial leg 3b, and an azimuthal pole piece section 3c again extending in the circumferential direction U.

The yoke or return section 3a forms a yoke J of the stator 1 or respectively of the stator base body 2, which is a separate part according to the variant shown in FIG. 2 in the so-called star-yoke design, while the radial legs 3b and pole shoe sections 3c of the stator teeth 3 then form the so-called star S of the stator 1 or respectively of the stator base body 2, which is inserted into the yoke J. In the single-tooth design not shown in detail, the stator 1 or respectively its stator base body 2 is composed of individual stator teeth 3, whereas in the variant according to FIG. 1 the stator 1 or respectively its stator base body 2 is designed as a solid body or is designed as a laminated core from individual laminations.

On the outer circumference 5 of the yoke J, i.e. on the outer circumferential side of the respective yoke or return section 3a of the corresponding stator tooth 3, axial grooves 6 extending in the axial direction A (FIG. 1) and radially inwards towards the axis of rotation D are formed in the stator base body 2. In a preferred embodiment, the respective axial groove 6 is dovetail-shaped, as can be seen comparatively clearly in FIG. 6.

When the stator 1 is wound, the radial legs 3b of the stator teeth 3 carry the single, double or multi-coils of the stator or rotating field winding. A joining element 7 is radially inserted into the respective axial groove 6 of the corresponding stator tooth 3 in a form-fitting manner.

Figure 4:
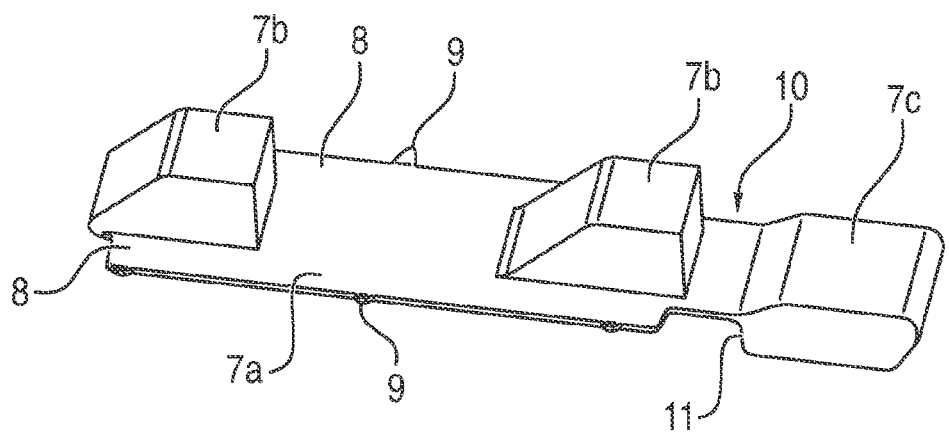
FIG. 4 is a perspective view of the joining element.

With reference also to FIG. 4, the joining element 7 has a base body 7a and, in the embodiment example, a number of two coupling elements 7b. The base body 7a projects beyond the respective coupling element 7b in the axial and radial directions A and R, respectively, and thus in the circumferential direction U on both sides, as can be seen comparatively clearly in FIG. 5. With this projection 8 on both sides (FIG. 4), the joining element 7 engages behind groove flanks 6a of the axial groove 6 formed within the axial groove 6 due to the dovetail shape. The groove flanks 6a form an undercut for the joining element 7 inserted axially into the axial groove 6.

In the embodiment example, respectively three clamping claws or clamping teeth 9 are formed on each side of the base body 7b of the joining element 7 on the outside of the projections 8. The clamping claws 9 are bent up out of the plane of the base body 7b in the direction of the erected coupling elements 7b. On one of the narrow sides 10 of the joining element 7, the latter has a shaped piece 7c. The shaped piece 7c has or forms an abutment edge or abutment surface 11, which extends out of the plane of the base body 7a on the side opposite the coupling elements 7b in the radial direction R. With this abutment edge or abutment surface 11, the joining element 7, in the assembled state inserted in the respective axial groove 6, rests against an end face 12 of the respective yoke or return section 3a.

Figure 7:
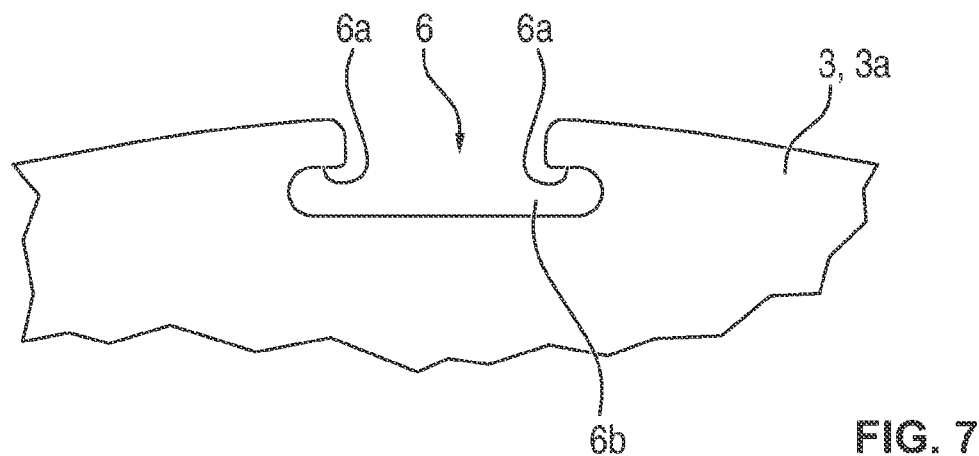
FIGS. 7 and 8 are front side views of the stator base body in sections in the yoke area with an axial groove, which is T-shaped in cross-section with a rounded or respectively angular leg contour.
Figure 8:
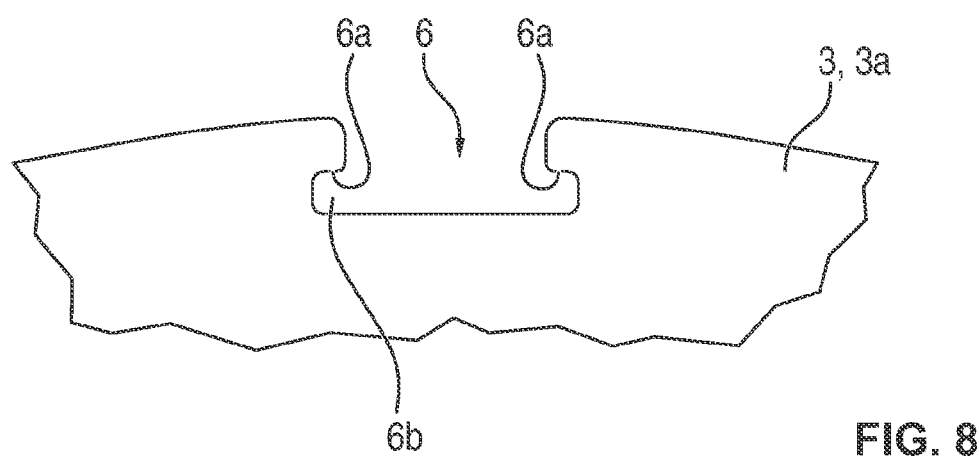

FIGS. 7 to 12 show variants of the geometry or respectively shape (cross-sectional shape) of the azimuthal groove 6 in the respective yoke or return section 3a of the stator base body 2. Thus, FIGS. 7 and 8 show T-shaped axial grooves 6, wherein in FIG. 7 the horizontal T-leg 6b is at least approximately circularly rounded in the region of the groove flanks (joint or undercut edges) 6a forming the undercut. In the embodiment according to FIG. 8, this region is less rounded or angular.

Figure 9:
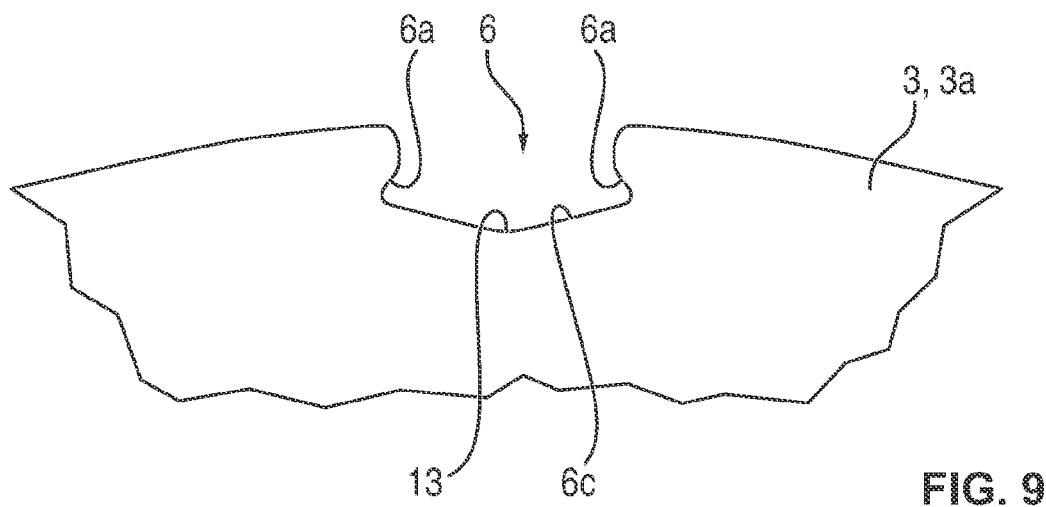
FIG. 9 is a front view according to FIGS. 7 and 8, showing an approximately T-shaped axial groove with a local depression in the horizontal T leg.

In the embodiment according to FIG. 9, the axial groove 6 has a radial recess or bead 13 in its groove bottom 6c.

Figure 10:
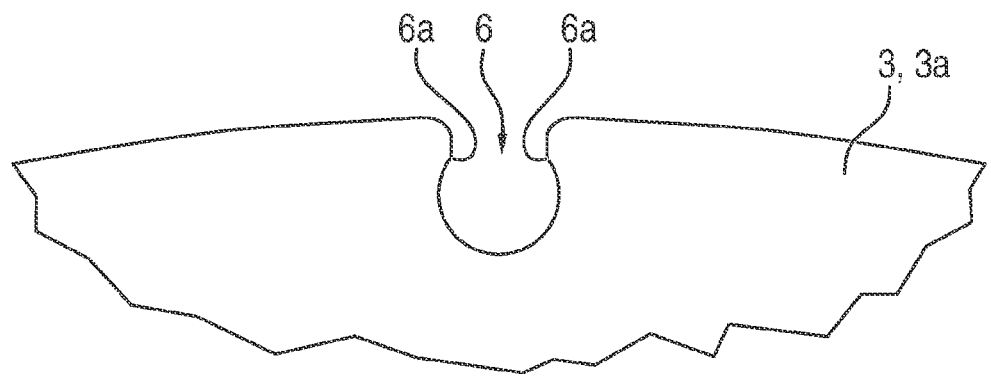
FIG. 10 is a front view according to FIGS. 7 and 8, showing a part-circular axial groove.
Figure 11:
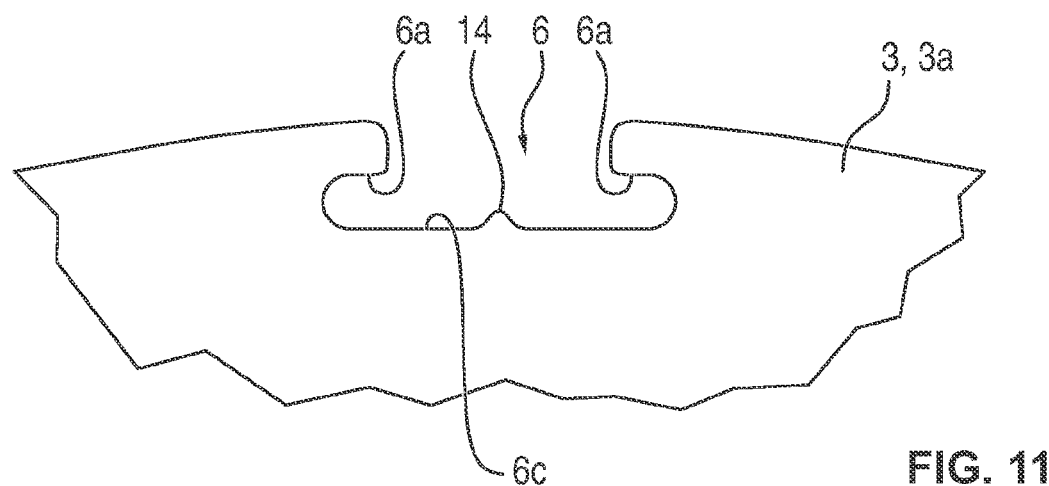
FIGS. 11 and 12 are front views according to FIGS. 7 and 8, showing an approximately T-shaped axial groove with a local elevation in the horizontal T leg.
Figure 12:
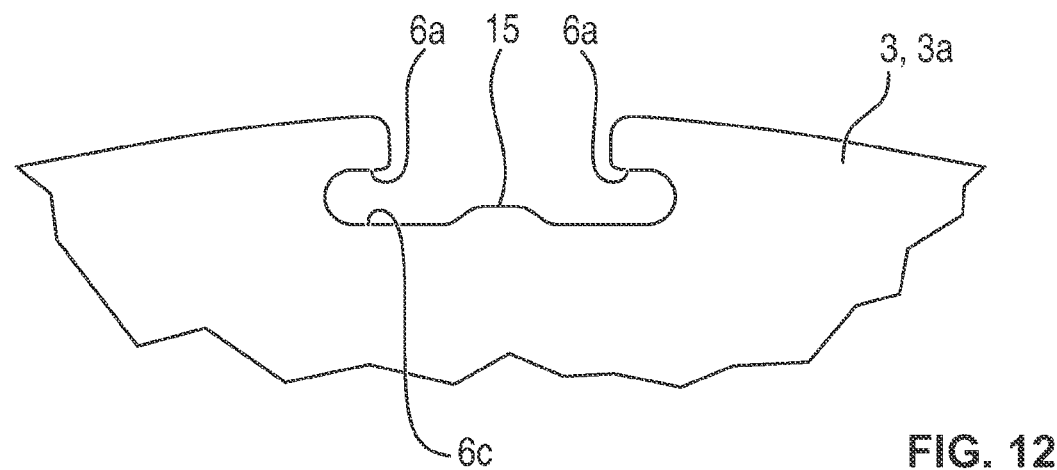

In the embodiment according to FIG. 10, the axial groove 6 is part-circular with a partial circle over preferably (250±20), so that sufficiently effective undercuts are formed by the groove flanks 6a.

The embodiments according to FIGS. 11 and 12 again respectively show a substantially T-shaped axial groove 6. In this context, the axial groove 6 has a wedge-shaped or cone-shaped (FIG. 11) and a frustoconical local elevation 14 or respectively 15 at the groove bottom 6c.

Figure 3:
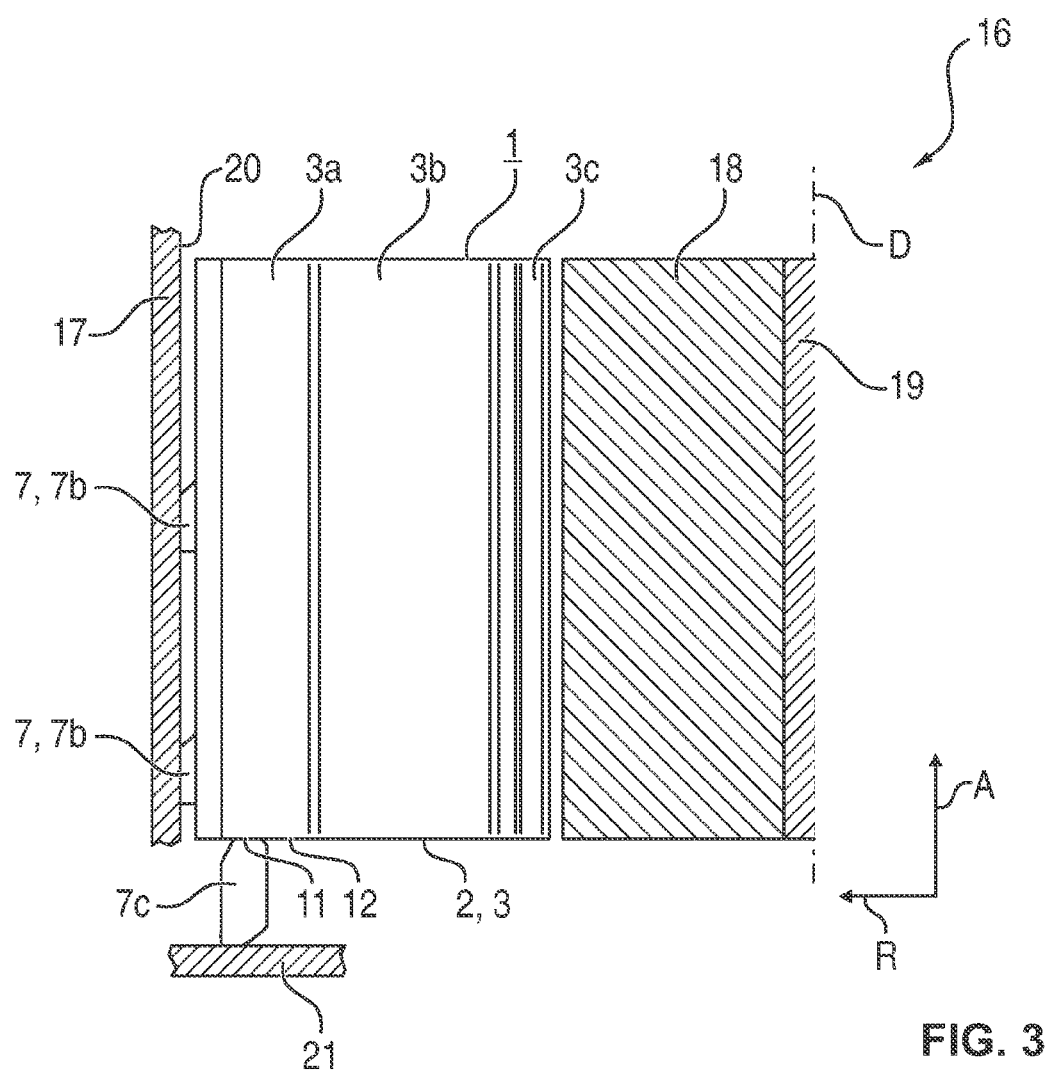
FIG. 3 is a partially sectional side view of the stator base body in the region of a stator tooth with a joining element inserted in the axial groove, the radially raised coupling elements of which rest against the inner wall of a housing (motor housing)

FIG. 3 shows, in a partially sectional view, an electric motor 16 with stator 1 inserted in a housing (motor housing) 17 without any stator or rotating field winding. Also indicated is a rotor 18 carrying permanent magnets and arranged to rotate about the axis of rotation D within the stator 1, forming a gap. As well indicated is a rotor or motor shaft 19, on which the rotor 18 is seated in a shaft-fixed manner.

Inside the housing 17, the stator 1 rests against the inner wall 20 of the motor housing 17 via the coupling elements 7b of the joining elements 7, which radially protrude and thus project beyond the stator 1 at the outer circumference 5 in the radial direction R. In this way, the stator 1 is decoupled from the housing (motor housing) 17 of the, for example, 10-pole electric motor 16. Additionally, the stator 1 bears on the end face against a bearing shield 21 via the shaped piece 7c of the joining elements 7 and is thus also decoupled with respect thereto. This reduces the transmission to the housing 17 and the bearing shield 21 of the structure-borne noise caused, for example, by the electromagnetic forces due to operation, in which the stator 1 is decoupled from the housing 17 and, if applicable, from the bearing shield 21 by means of the joining elements 7. The joining elements 7 can additionally or alternatively fulfill a damping, fixing and/or positioning task.

The joining elements 7 can be inserted into the axial grooves 6 in axial direction A automatically and in a particularly simple manner. Additionally, the joining elements 7 are held in a radially form-fitting manner and thus reliably within the axial grooves 6. Further fixing of the joining elements 7 in the axial grooves 6 is achieved by the azimuthally projecting and slightly radially bent-up clamping claws 9.

The invention is not limited to the embodiment example described above. Rather, other points of the invention may also be derived therefrom by the expert without leaving the subject matter of the invention. Furthermore, in particular, individual features described in connection with the embodiment example can also be combined with each other in other ways without leaving the subject matter of the invention.

Additionally, the described solution can be used not only in the specifically illustrated application, but also in similar embodiments in other motor vehicle applications, such as electric brake motors, door and tailgate systems, window regulators, vehicle locks, adjustable seat and interior systems, as well as in electric drives, controls, sensors and their arrangement in the vehicle, or in other electrical machines and systems.

The following is a summary list of reference numerals and the corresponding structure used in the above description of the invention:

1 stator
2 stator base body
3 stator tooth
3a yoke/return section
3b radial leg
3c pole shoe section
4 free space
5 outer circumference
5 axial groove
6a groove flank/undercut
6b T leg
6c groove bottom
7 joining element
7a base body
7b coupling element
7c shaped piece
8 overhang
9 clamping claw/tooth
10 narrow side
11 abutment edge/surface
12 front side
13 recess/bead
14 wedge/conical elevation
15 frustoconical elevation 16 electric motor
17 motor housing/housing
18 rotor
19 rotor/motor shaft
20 inner wall
21 bearing shield
A axial direction
D axis of rotation
J yoke
S star
R radial direction
U circumferential direction

The invention claimed is:

1. A stator for an electric motor, the stator comprising:
a stator base body containing stator teeth disposed in a star shape and a stator yoke, said stator base body having an outer circumference with a plurality of axial grooves formed therein;
joining elements disposed in said axial grooves and projecting radially from said outer circumference of said stator base body and being inserted in a radially form-fitting manner;
each of said joining elements having a base body and at least one coupling element being raised in a radial direction and projecting out of a respective one of said plurality of axial grooves; and
at least one clamping claw disposed on one longitudinal side of said base body.

2. The stator according to claim 1, wherein each of said axial grooves are dovetail-shaped or T-shaped.

3. The stator according to claim 1, wherein each of said axial grooves having a groove bottom with an elevation or a bead-shaped depression formed therein.

4. The stator according to claim 3, wherein said elevation is a local elevation.

5. The stator according to claim 1, wherein said base body projects beyond said at least one coupling element in an axial direction and in a circumferential direction of said respective axial groove.

6. The stator according to claim 1, wherein:
said base body has a narrow side; and
each of said joining elements has a shaped piece projecting axially out of said respective axial groove and is disposed on said narrow side of said base body.

7. The stator according to claim 6, wherein:
said stator base body has an end face; and
said shaped piece has an abutment edge or abutment surface, and by means of said abutment edge or said abutment surface, said joining element rests against said end face of said stator base body.

8. An electric motor, comprising:
a rotor shaft;
a shaft-fixed rotor;
said stator according to claim 1; and
a housing with said stator disposed therein.

9. The electric motor according to claim 8, wherein said joining elements are axially inserted into said axial grooves.

10. A stator for an electric motor, the stator comprising:
a stator base body containing stator teeth disposed in a star shape and a stator yoke, said stator base body having an outer circumference with a plurality of axial grooves formed therein;
joining elements disposed in said axial grooves and projecting radially from said outer circumference of said stator base body and being inserted in a radially form-fitting manner;
each of said joining elements having a base body and at least one coupling element being raised in a radial direction and projecting out of a respective one of said plurality of axial grooves; and
at least one clamping claw disposed on one longitudinal side of said base body, said at least one clamping claw being bent up out of a plane of said base body.

* * * * *